United States Patent [19]
Sato et al.

[11] Patent Number: 5,526,077
[45] Date of Patent: Jun. 11, 1996

[54] ORIGINAL FEEDING DEVICE

[75] Inventors: Shunji Sato, Tokyo; Kimiaki Hayakawa, Yokohama; Yoshihiko Kitahara, Ushiku; Kenichi Iizumi, Ibaraki-ken; Noriaki Nakazawa, Yokohama, all of Japan

[73] Assignees: Canon Kabushiki Kaisha, Tokyo; Canon Aptex Inc., Ibaraki-ken, both of Japan

[21] Appl. No.: 273,134

[22] Filed: Jul. 14, 1994

[30] Foreign Application Priority Data

Jul. 19, 1993 [JP] Japan ................................ 5-200073
Jul. 21, 1993 [JP] Japan ................................ 5-180355

[51] Int. Cl.⁶ .......................................... G03B 23/02
[52] U.S. Cl. ....................... 353/103; 353/114; 353/DIG. 1
[58] Field of Search .......................... 353/103, 104, 353/114, 120, DIG. 3, DIG. 5, DIG. 1; 355/50

[56] References Cited

U.S. PATENT DOCUMENTS

| | | | |
|---|---|---|---|
| 3,317,151 | 5/1967 | Wright | 353/DIG. 5 |
| 3,594,082 | 7/1971 | Lonchar | 353/DIG. 5 |
| 4,050,816 | 9/1977 | Stemmle | 355/75 |
| 4,264,158 | 4/1981 | Lindqvist | 353/DIG. 5 |
| 4,982,228 | 1/1991 | Watanabe | 355/64 |
| 5,059,020 | 10/1991 | Gènićis | 353/DIG. 5 |
| 5,172,145 | 12/1992 | Stephenson | 353/DIG. 5 |
| 5,339,122 | 8/1994 | Polak et al. | 353/DIG. 5 |

FOREIGN PATENT DOCUMENTS

| | | | |
|---|---|---|---|
| 0421330 | 4/1991 | European Pat. Off. | |
| 1281836 | 10/1968 | Germany | |
| 0258437 | 11/1987 | Japan | 353/DIG. 5 |

*Primary Examiner*—William C. Dowling
*Attorney, Agent, or Firm*—Fitzpatrick, Cella, Harper & Scinto

[57] ABSTRACT

An original feeding device for feeding OHP originals to the display stage of an overhead projector is capable of transportation control suitable for OHP projection. The originals are transported by a conveying film onto the display stage. In order to stop the original at the center of the display stage, after the original is detected by the registration sensor, the conveying film is advanced by an amount equal to the sum of the distance from the registration sensor to the display stage, a half of the length of the display stage and a half of the length of the original.

12 Claims, 12 Drawing Sheets

ORIGINAL FEEDING DEVICE

BACKGROUND OF THE INVENTION

1. Field of the Invention

The present invention relates to an original feeding device adapted to be fitted on an overhead projector.

2. Related Background Art

In the known overhead projector, the user who is making a presentation has to manually place the transparency sheets, or the originals for such overhead projector, one by one on the display stage of the overhead projector, and such sheet replacing operation has been an obstacle to the presentation. Also, the already projected sheets and those to be projected are often mixed up on the table, and such situation has also been an obstacle to the presentation.

Such drawbacks will be resolved by a device for automatically feeding the sheets onto the display stage of the overhead projector (OHP), but such device has not been realized because of the following difficulties.

In such an OHP original feeder for feeding the OHP originals, the center of the display stage should preferably coincide with that of the original to be displayed in order to facilitate observation of the observers, but such requirement cannot be met if the originals are variable in size or if vertically oblong originals and laterally oblong originals are mixedly present.

On the other hand, in the OHP original feeder for feeding the OHP originals by means of a conveying film, such convey film represents a considerable portion of the cost. For this reason, the gaps between the originals are generally shortened in order to economize the amount of the convey film to be used. However, if the gaps are made too short, there will result a drawback that, while an original is projected on the display stage, the next original is partly projected.

Also, in such an OHP original feeder for feeding the OHP originals by means of the convey film, if a user cuts off the power supply while erroneously leaving his OHP originals on the feeder and if the next user tries to feed his originals without noticing such left originals, the original feeding becomes impossible because of the limit in the number of originals receivable in the feeder.

Also, in the OHP original feeder for feeding the OHP originals, the user often wishes to make fine adjustment on the stopping position of the OHP original on the display stage.

Furthermore, in the OHP original feeder for feeding the OHP originals, the observer receives an unpleasant impression if the original feeding is too fast, as the feeding is effected while the original is projected. However, if the original feeding is too slow, there will be required an excessively long time, interfering with the limited time of presentation.

SUMMARY OF THE INVENTION

In consideration of the foregoing, the object of the present invention is to provide an original feeding device not associated with the above-mentioned drawbacks.

The above-mentioned object can be attained, according to the present invention, by an original feeding device, for feeding originals onto a display stage of a projector for projecting the image of the original placed on the display stage, comprising original length detection means for detecting the length of the original, transport means for feeding the original onto the display stage, and control means for activating the transport means, after the front end of the original transported by the transport means passes the end portion of the display stage, for a length equal to the sum of a half of the length of the display stage and a half of the length of the original detected by the original length detection means.

Also, according to the present invention, there is provided an original feeding device, for continuously feeding originals onto a display stage of a projector for projecting the image of the original placed on the display stage, comprising original length detection means for detecting the length of the original, transport means for transporting plural originals one by one onto the display stage, and control means for activating the transport means, after the front end of the original transported by the transport means passes the end portion of the display stage, for a length equal to the sum of a half of the length of the display stage and a half of the original detected by the original length detection means, wherein the transport means controls the transportation of the originals in such a manner that the distance between the rear end of an original and that of a succeeding original becomes equal to the difference obtained by subtracting a half of the length of the original detected by the original length detection means from a half of the length of the display stage.

There is also provided an original feeding device, for feeding originals onto a display stage of a projector for projecting the image of the original placed on the display stage, comprising a transparent belt for transporting the originals, a roller for winding the belt, detection means for detecting a mark on the belt, and control means for rotating the roller in the forward or reverse direction by a predetermined amount at the start of power supply to the original feeding device thereby causing the detection means to effect detection of the mark.

Other objects of the present invention, and the features thereof, will become fully apparent from the following description to be taken in conjunction with the attached drawings.

DESCRIPTION OF THE PREFERRED EMBODIMENTS

Figure 1:
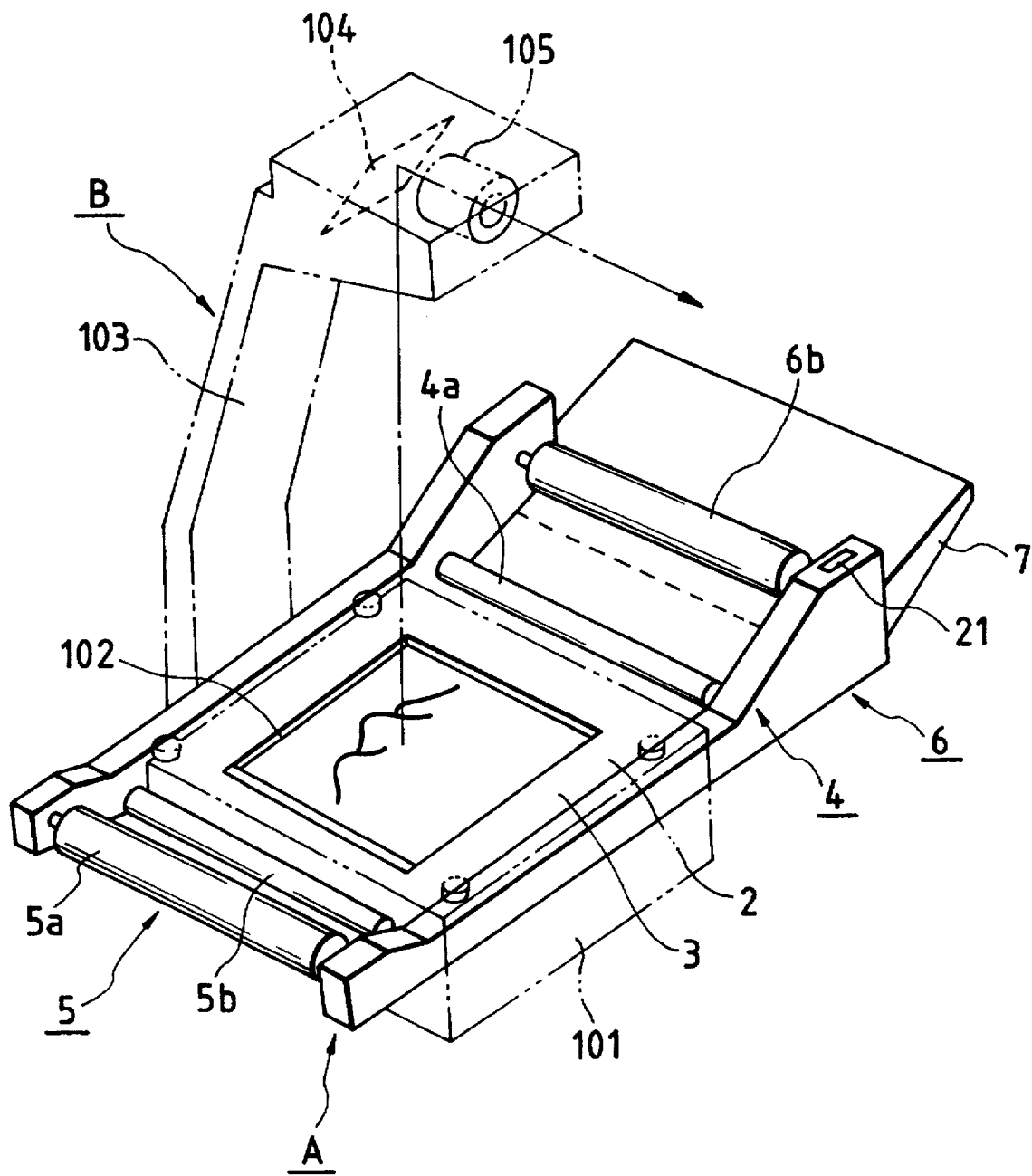
FIG. 1 is an external perspective view of an overhead projector utilizing an original feeding device.
Figure 2:
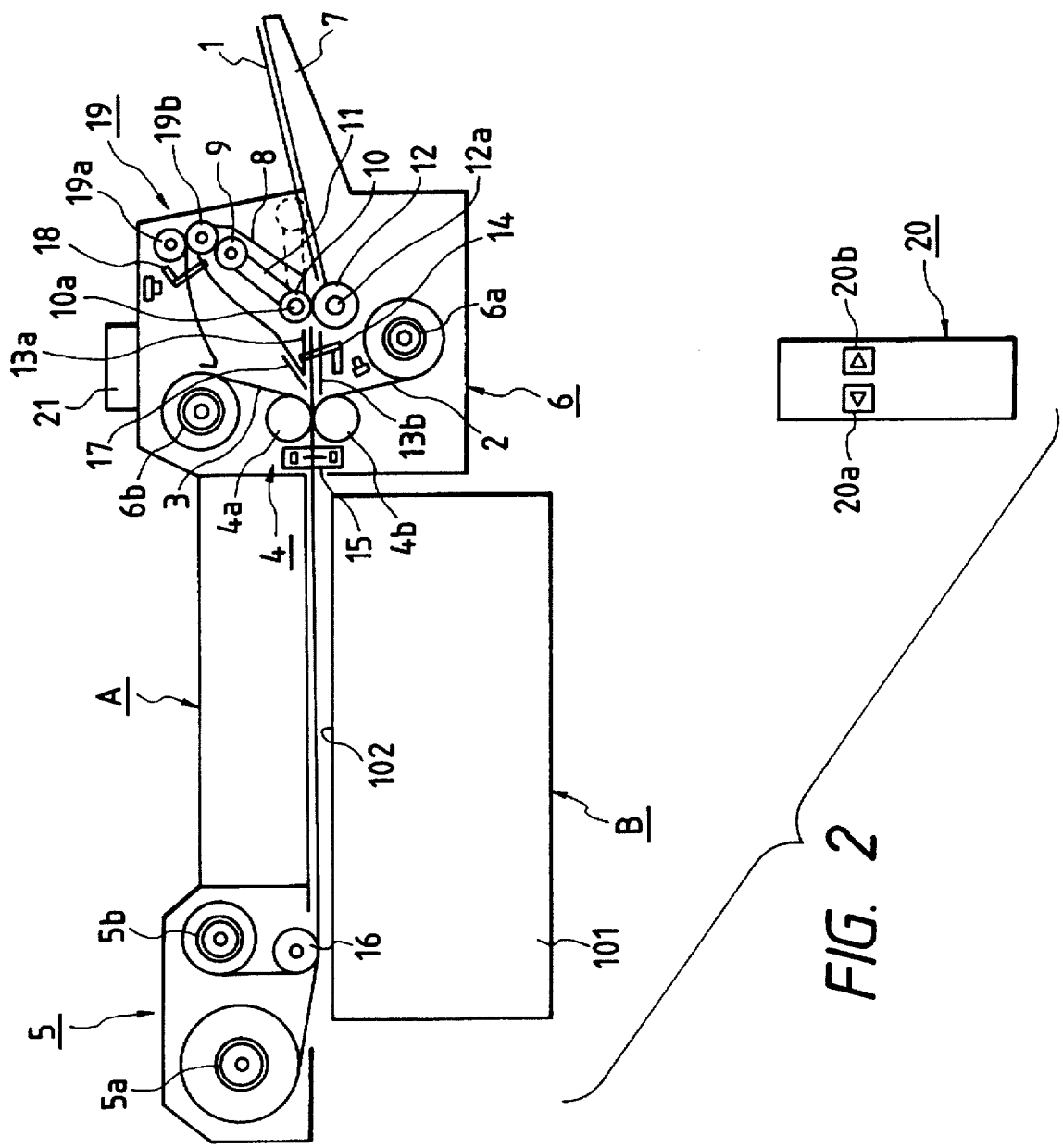
FIG. 2 is a cross-sectional view of the original feeding device.
Figure 3:
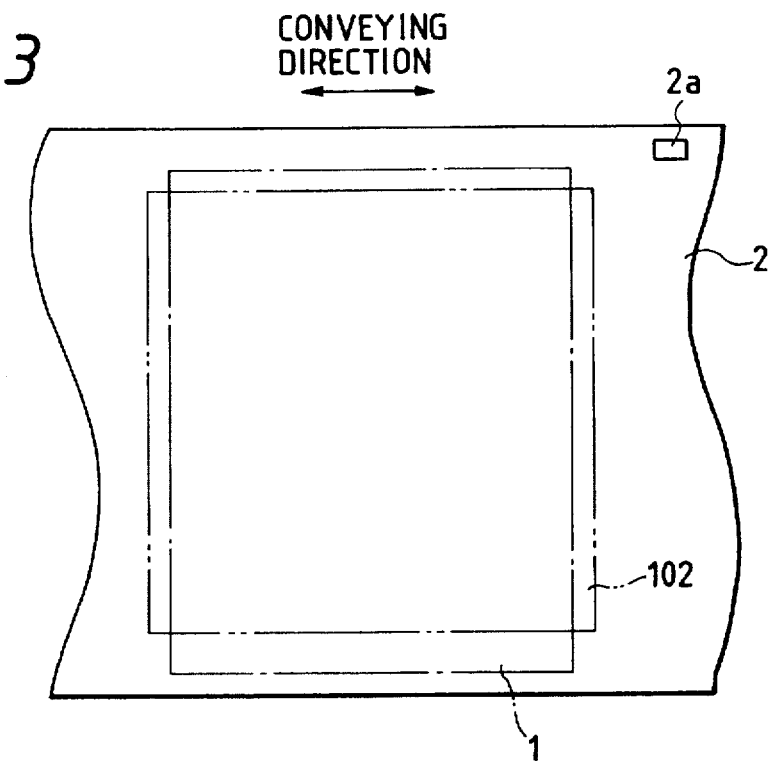
FIG. 3 is a schematic view of convey films.
Figure 4:
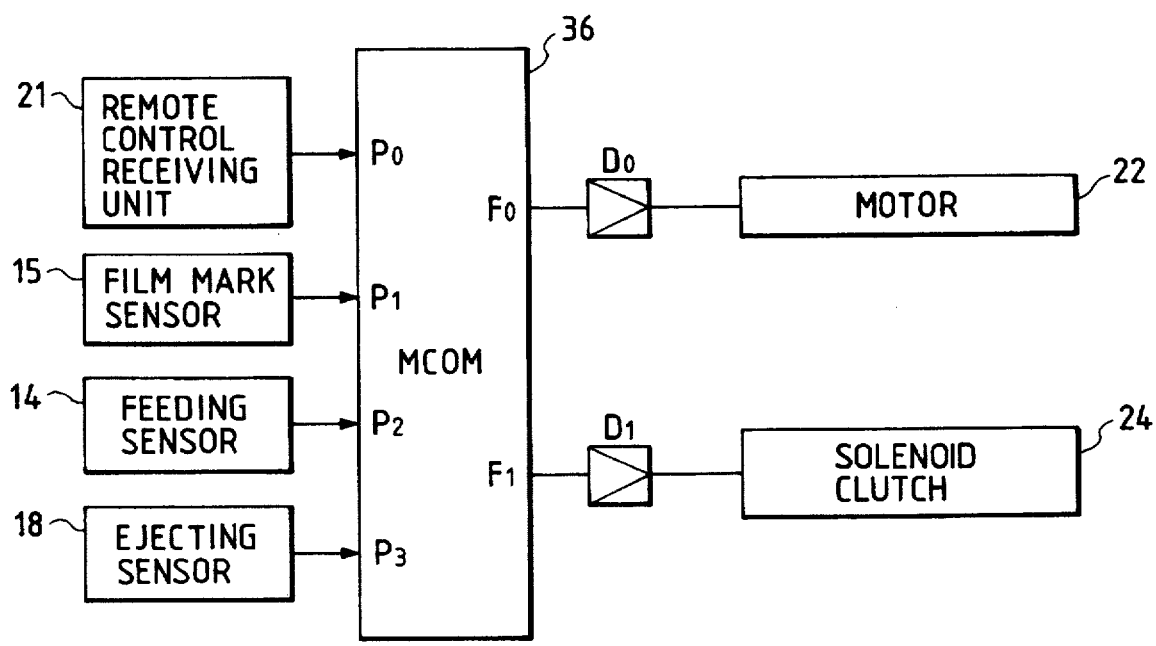
FIG. 4 is a block diagram of the control system of the original feeding device.

Now, the original feeding device of the present invention will be clarified in detail by an embodiment thereof shown in the attached drawings, wherein FIG. 1 is an external perspective view of an overhead projector (OHP) employing an original feeding device, FIG. 2 is a cross-sectional view of the original feeding device, FIG. 3 is a schematic view of a transporting film, and FIG. 4 is a block diagram of the control system of the original feeding device.

Configuration of OHP

At first, reference is made to FIG. 1 for explaining the entire configuration of the original feeding device A of this embodiment and the overhead projector B. The original feeding device A is mounted on the overhead projector B, indicated by chain lines in FIG. 1, and is used for automatically feeding OHP originals 1 to be used on the overhead projector B. The originals 1, separated one by one in the order of pages from a stack of plural originals by means of a separating-transporting mechanism to be explained later, are individually sandwiched between a conveying film 2, consisting of a web-shaped transparent film, and a pressing film 3, consisting similarly of a web-shaped transparent film, and the films 2, 3 with the originals 1 sandwiched therebetween are transported in contact with an exposure stage 101 by film transporting means 4. The conveying film 2 and pressing film 3 are wound on second winding means 6 and are taken up by the rotation of first winding means 6. Thus, the above-mentioned original 1, supported between the conveying film 2 and the pressing film 3, is transported onto a platen glass 102 provided in the exposure stage 101 of the overhead projector B. The original 1 is illuminated by the light from the exposure stage 101, and the transmitted light is projected on an unrepresented screen through projection means consisting of a mirror 104 and a lens 105 and supported above by an arm 103, whereby the image borne by the original is projected in magnified manner.

In the following there will be given a detailed description on the structure of the original feeding device A mentioned above.

Separated transporting mechanism

Referring to FIG. 2, a feeding tray 7 is provided for supporting a stack of the originals, which are stacked along a guide member 8, with the image-bearing faces upwards and in the increasing order of page numbers from the top to the bottom. A pick-up roller 9 is rotatably supported by a rocking arm 11, rotatable about a shaft 10 of a feed roller 10. When the feeding operation is started, the rocking arm 11 is rotated clockwise to press the pick-up roller 9 onto the top of the original stack, whereby the originals 1 are fed in succession from the top of the stack. The feed roller 10 is provided for transporting the originals 1, fed by the above-mentioned pick-up roller 9, toward the downstream side. A separating roller 12 is maintained in pressure contact, by means of an unrepresented spring, with the feed roller 10. The shaft 12a of the separating roller 12 is provided therein with a one-way clutch, which transmits clockwise rotation only to the separating roller 12. Each original 1 is thus separated and transported by the feed roller 10 and the separating roller 12, rotated in the same direction, and is guided by an upper transport guide 13a and a lower transport guide 13b until the front end reaches the nip of paired transport rollers 4a, 4b. A feed sensor 14 is provided for detecting the front and rear ends of the original 1.

Conveying film and pressing film

The convey film 2 and the pressing film 3 support the originals 1 by sandwiching, and are composed of web-shaped transparent films wider than the width of the originals 1. The films are preferably made thinner as long as enough strength can be maintained, and those of a thickness within a range of about 25 to 60 μm are preferably employed. They are preferably composed of a material of satisfactory light transmittance and stable heat resistance, and a preferred example is polyethylene terephthalate film.

The above-mentioned convey film 2 supports the originals 1 and effects transportation thereof by the winding motion of the conveying film 2. On the other hand, the pressing film 3 presses the upper faces of the originals 1 supported on the conveying film 2, thereby preventing the lifting of the originals 1, for example, by curling, and also preventing damage to the originals 1.

At an end portion of the conveying film 2, in the transversal direction thereof, and at the front end of the conveying film, there is provided a film end mark 2a as shown in FIG. 3. The home position of the conveying film 2 is defined at a position where the film end mark 2a is detected by a film mark sensor 15, and the transporting operation for the originals 1 is started from the home position.

Film transporting unit

The conveying film 2 is connected, at the ends thereof, to a first transport roller 5a mounted on the first winding means 5 and a second transport roller 6a mounted on the second winding means 6, and is maintained in close contact with the pressing film 3 at the paired film transporting rollers 4a, 4b and a tension roller 16. The pressing film 3 is connected, at the ends thereof, to a first pressing roller 5b provided on the first winding means 5 and a second pressing roller 6b provided on the second winding means 6, and is similarly maintained in close contact with the conveying film 2 at the paired film transporting rollers 4a, 4b and the tension roller 16.

In the paired rollers, the upper roller 4a and the lower roller 4b are maintained in mutual contact with a pressure of 1 to 2 kgf, and serve to control the transportation of the conveying film 2 and the pressing film 3, and to extract the original 1, separated and transported as explained before, from the paired feeding-separating rollers 10, 12 and to insert thus extracted original between the conveying film 2 and the pressing film 3 for transportation.

First winding means

The first winding means 5 serves to take up an end of the web-shaped conveying film 2 and pressing film 3, and is provided, as shown in FIG. 1, outside the image reading area of the exposure stage 101 of the overhead projector B. In the present embodiment, it is positioned, as shown in FIG. 2, at the left side of the image reading area of the exposure stage 101, and rotatably supports the first transport roller 5a for taking up the conveying film 2 and the first pressing roller 5b for taking up the pressing film 3, on front and rear frames.

On the external periphery of the first transporting roller 5a, the conveying film 2 is fixed, for example, with cellophane tape, and the film 2 is taken up by the rotation of the first transporting roller 5a.

Also, on the external periphery of the first pressing roller 5b, the pressing film 3 is fixed, for example, with cellophane tape, and the film 3 is taken up by the rotation of the first pressing roller 5b.

Second winding means

The second winding means 6 serves to wind the other ends of the conveying film 2 and the pressing film 3, and is provided outside the image reading area of the exposure stage 101 of the overhead projector B, as shown in FIG. 1. In the present embodiment, it is positioned, as shown in FIG. 2, at the right side of the outside of the image reading area of the exposure stage 101, and rotatably supports, the second transporting roller 6a for winding the conveying film 2 and the second pressing roller 6b for winding the pressing film 3, by front and rear frames.

On the external periphery of the second transporting roller 6a, the conveying film 2 is fixed, for example, with cellophane tape, and the conveying film 2 is taken up by the rotation of the second transporting roller 6a.

Also, on the external periphery of the second pressing roller 6b, the pressing film 3 is fixed, for example, with cellophane tape, and the pressing film 3 is taken up by the rotation of the second pressing roller 6b.

Tension means

The tension roller 16 and the paired film transporting rollers 4a, 4b mentioned above serve to tent the conveying film 2 and the pressing film 3, with the originals 1 sandwiched therebetween, in mutually contacting relationship on the platen glass 102 of the overhead projector B. In the present embodiment, as shown in FIG. 2, the tension roller 16 and the paired film transporting rollers 4a, 4b are respectively provided at the left and right sides of the image reading area of the exposure stage 101.

On the external periphery of the tension roller 16, the pressing film 3 and the conveying film 2 are supported in succession so that the two films are maintained in mutual contact. With the movement of the conveying film 2 and the pressing film 3 to the left or to the right, the tension roller 16 is rotated by the films so that the films are protected from the scars by friction.

Discharge means

As shown in FIG. 2, a pick-up Myler member 17 is provided. In the rightward movement of the original 1 supported between the conveying film 2 and the pressing film 3, when the front end of the original 1 passes the nip between the paired film transporting rollers 4a, 4b, the front end is guided by the pick-up Myler member 17 into a discharge path. When the front end of the original 1 is detected by a discharge sensor 16 by further movement of the transporting film 2 and the pressing film 3 to the right, the paired discharge rollers 19 are activated to discharge the original 1 onto the tray 7. The above-mentioned paired discharge rollers 19 is composed of a driven discharge roller 19a and an idler roller 19b maintained in contact, with a light pressure, with the driven roller 19a and rotated thereby.

Remote controller

A remote control unit 20 shown in FIG. 2 is provided with a forward button 20a and a reverse button 20b. A remote control receiving unit 21 effects driving and stopping of the original feeding device by remote control, utilizing the signals generated by the remote control unit 20.

Control unit

In the following there will be explained the control unit of the original feeding device A, with reference to a block diagram shown in FIG. 4. The control operation of the original feeding device A is principally conducted by a known one-chip microcomputer (MCOM) 36 incorporating ROM, RAM, etc. Input ports P0–P3 of the MCOM 36 receives signals from the above-mentioned remote control receiving unit 21 for receiving the signals from the remote control unit 20, the film mark sensor 15 for detecting the film end mark 2a on the conveying film 2, the discharge sensor 18 for detecting the fed original 1, etc.

Also, output ports F0, F1 of the MCOM 36 releases various output signals for turning on and off a motor 22 for driving the rollers for transporting the conveying film 2, the pressing film 3 and the originals 1, and for turning on and off the solenoid clutch 24 for controlling the gaps of the originals 1 to be transported. The motor 22 directly drives the paired transporting rollers 4a, 4b, the transport rollers 5a, 5b, 6a and 6b, and also drives the pick-up roller 9 and the feeding-separating rollers 10, 12 through the solenoid clutch 24.

The fetching of the above-mentioned input signals and the on/off operations of the loads are conducted according to a program stored in the ROM associated with the MCOM 36.

Home positioning mechanism for transporting film

The film mark sensor 15 shown in FIG. 2 is composed of a photosensor fixed on the frame, is positioned at a position corresponding to the end portion of the conveying film 2 and detects the opaque film end mark 2a provided thereon. The film end mark 2a is provided at the frontmost position of the conveying film 2 within the transportable range thereof, and the home positioning of the film, at the position of the film end mark 2a, is conducted after the start of power supply. cl Original transporting operation In the following there will be explained the original transporting operation of the original feeding device A, with reference to FIG. 2. At first, a stack of the originals is placed by the user on the tray 7, with the front end of the stack impinging on the separating roller 12. When the forward button 20a of the remote control unit 20 is depressed, the motor 22 starts to rotate clockwise, to rotate the upper transporting roller 4a in the same direction, thereby transporting the conveying film 2 and the pressing film 3 toward left in FIG. 2. The first transport roller 5a and the first pressing roller 5b are rotated at a high speed, with slippage, to take up the conveying film 2 and the pressing film 3.

Then, the solenoid clutch 24 is activated to rotate the feed roller 10 clockwise. At the same time, the pick-up roller 9 is rotated clockwise and the rocking arm 11 is rotated clockwise about the feed roller shaft 10a to place and press the pick-up roller 9 onto the original stack. Thus, the originals are fed in succession, from the uppermost one, into the nip of the feed roller 10 and the separating roller 12. As the friction coefficient $\mu$ between the feed roller 10 and the original (OHP sheet) 1 is selected larger than the friction coefficient $\mu$ between the separating roller 12 and the original 1, an upper original alone is transported even if two originals simultaneously enter the nip.

When the front end of thus separated and transported original is detected by the feed sensor 14, the original 1 is supported between the paired film transporting rollers 14. After the original 1 is subsequently transported by about 50 mm between the conveying film 2 and the pressing film 3, the solenoid clutch 24 is turned off. As the transporting force of the paired film transporting rollers 4a, 4b for the original 1 is selected larger than the transporting force exerted by the separating-transporting unit, the original 1 is transported by the paired rollers 4a, 4b only, after the deactivation of the solenoid clutch 24, whereby the feed roller 10 and the separating roller 12 are driven by the original 1 which is extracted from the nip of the rollers.

The length of the original 1 is measured as the rear end thereof passes the feed sensor 14. The length of the original 1 can be determined by calculating the distance by the number of steps given to the motor 22 within the period from the turning-on to the turning-off of the feed sensor 14. The length from the rear end of the original to the center thereof is equal to a half of the length of the original 1, and the motor 22 is so controlled and stopped so that the center of the original coincides with the center of the exposure stage 101 of the overhead projector B. When the forward button 20a of the remote control unit 20 is subsequently depressed, a next original 1 is set on the platen glass 102 of the overhead projector B by the above-explained operations. The subsequent original advancement can be achieved by the repetition of the above-explained operations.

The transporting operation is conducted in the following manner when the originals 1 are reversed. As the reverse button 20b of the remote control unit 20 is depressed, the motor 22 is rotated anticlockwise to rotate the upper film transporting roller 4a in the same direction, thereby transporting the conveying film 2 and the pressing film 3 to the right in FIG. 2. The second transport roller 6a and the second pressing roller 6b are rotated at a high speed, with slippage, to take up the conveying film 2 and the pressing film 3.

Then, the solenoid clutch 24 is activated to rotate the feed roller 10 counterclockwise. At the same time, the pick-up roller 9 is rotated counterclockwise, and the rocking arm 11 is rotated counterclockwise about the feed roller shaft 10a to retract the pick-up roller 9 from the tray 7. The original 1 is transported toward right in FIG. 2 and, as it passes the nip of the paired film transporting rollers 4, the front end of the original 1 is picked up by the pick-up Myler member 17 and is guided into the discharge path. When the front end of the original 1 is detected by the discharge sensor 18, the paired discharge rollers 19 are activated to transport the original 1. When the original 1 is transported by a predetermined amount after the turning-on of the discharge sensor, the motor 22 is so stopped that the center of a preceding original 1 coincides with the center of the exposure stage of the overhead projector B. In this state, the original 1 is discharged and stacked on the tray 7.

Through these operations, the originals 1 are stacked on the tray 7 with the proper sequence of pages and with the image-bearing faces upwards. In this manner, the sequence of pages is properly maintained and the sequential access is rendered possible in the forward or reverse feeding operation.

In the above-explained configuration, the user can initiate presentation by merely operating the remote control unit 20 after placing the originals 1, stacked in the order of pages, on the tray 7, so that the setting of the originals 1 and the preparation for presentation can be expedited.

Also, as arbitrary access is made possible by the transportation of the originals in the order of pages, smooth access to any desired original 1 even in case it is already used in the presentation or in case a specified original is looked for.

Also, in case the user is replaced by another, he can recover the used originals 1 by discharge onto the tray 7, and the next user can change within a short time by merely placing the originals on the tray 7. Also, the originals 1 recovered on the tray 7 need not be rearranged as they are in the proper order of pages.

Also, in case another original 1 is to be inserted in the course of presentation, it may be inserted at any position by placing the original 1, followed by a feeding operation.

As explained in the foregoing, the work and time required for the original setting, preparation for presentation and change of the users can be curtailed. Also, the originals can be transported or recovered without disturbing the order of pages, and smooth access to any original in the course of transportation is possible. In this manner, the convenience of use of the device is significantly improved.

In the following there will be explained another embodiment of the present invention.

Figure 5:
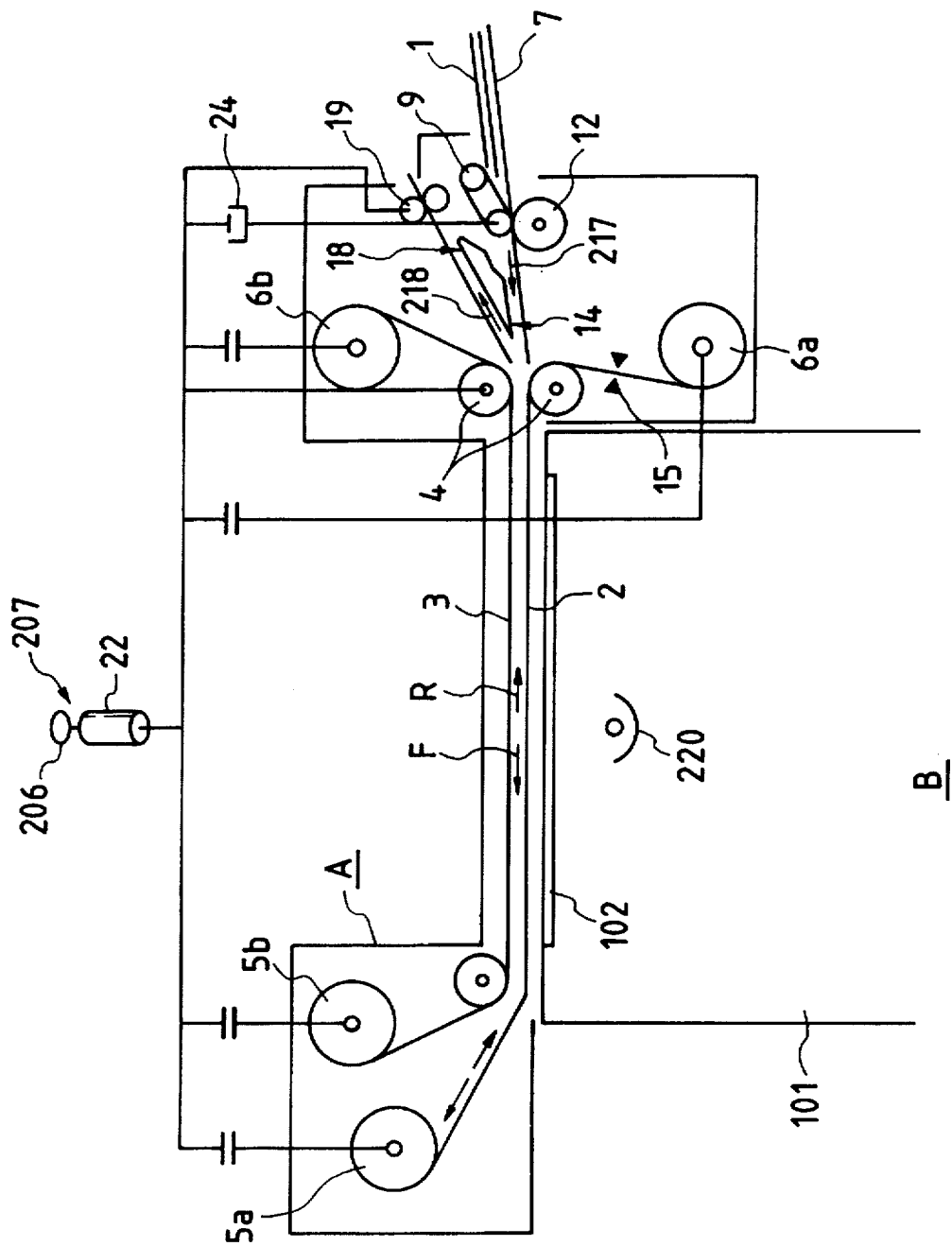
FIG. 5 is a schematic view showing the configuration of an overhead projector (OHP) original feeder.

FIG. 5 shows the configuration of an OHP original feeder (hereinafter simply called OHP feeder). The OHP feeder is so mounted as to cover the exposure stage of the OHP 101. The user stacks the originals to be presented in advance on the OHP feeder, and achieves individual feeding of the originals, fine adjustment of the position of the original, discharge of the original, etc. by remote control, utilizing, for example, an infrared remote control unit (not shown).

Numeral 1 indicates a transparent original to be projected by the overhead projector. A pick-up roller 9 is linked with a transporting motor 22 through a solenoid clutch 24, and separates and transports the originals from the top side.

The separated and transported original 1 reaches the position of a registration sensor 14 through a transport path 217, then further transported to be pinched between a transparent upper transporting film 3 and a lower conveying film 2, taken up by winding rollers 5a, 5b, 6a, 6b and pinch rollers 4. Then, transported in a direction F to a display stage 102 and stopped. In this operation, the length of the original and the position thereof in the course of transportation can be measured by the number of output pulses of a clock sensor 209 detected while the registration sensor 14' is turned on.

The position of the original 1 thus stopped on the display stage 102 can be finely adjusted, if desired by the user, by a slight movement of the conveying films 3, 2.

The original 1 on the display stage 102 is illuminated by a lamp 220, whereby the image of the original 1 is projected, through a lens, onto a white wall or the like.

The original 1 after presentation is transported further in the direction F from the display stage 102 and is taken up together with the conveying film 2 by the winding roller 5a, while a next original is transported with a certain gap from the preceeding one. The above-mentioned operation is repeated until all the originals are presented.

In case of discharging the originals wound on the winding roller 5a after the presentation of the originals, the transporting motor 22 is reversed to transport the originals in a direction R. The original 1 transported from the winding roller 5a passes the display stage 102, and is released from the upper and lower conveying films 3, 2 after passing the pinch roller 4. Upon further transportation of the original 1 in the direction R, the original is picked upwards at the branching point of the transport paths and proceeds toward a discharge path 218.

Upon entering the discharge path 218, the original 1 is discharged from the device by discharge rollers 19. A discharge sensor 18 monitors the state of transportation of the original on the discharge path 218. This operation is conducted until all the originals are discharged.

At this point, a home position marker, provided on the lower conveying film 2 is detected by a film marker sensor 15, whereby the home position of the conveying film can be confirmed.

Figure 6:
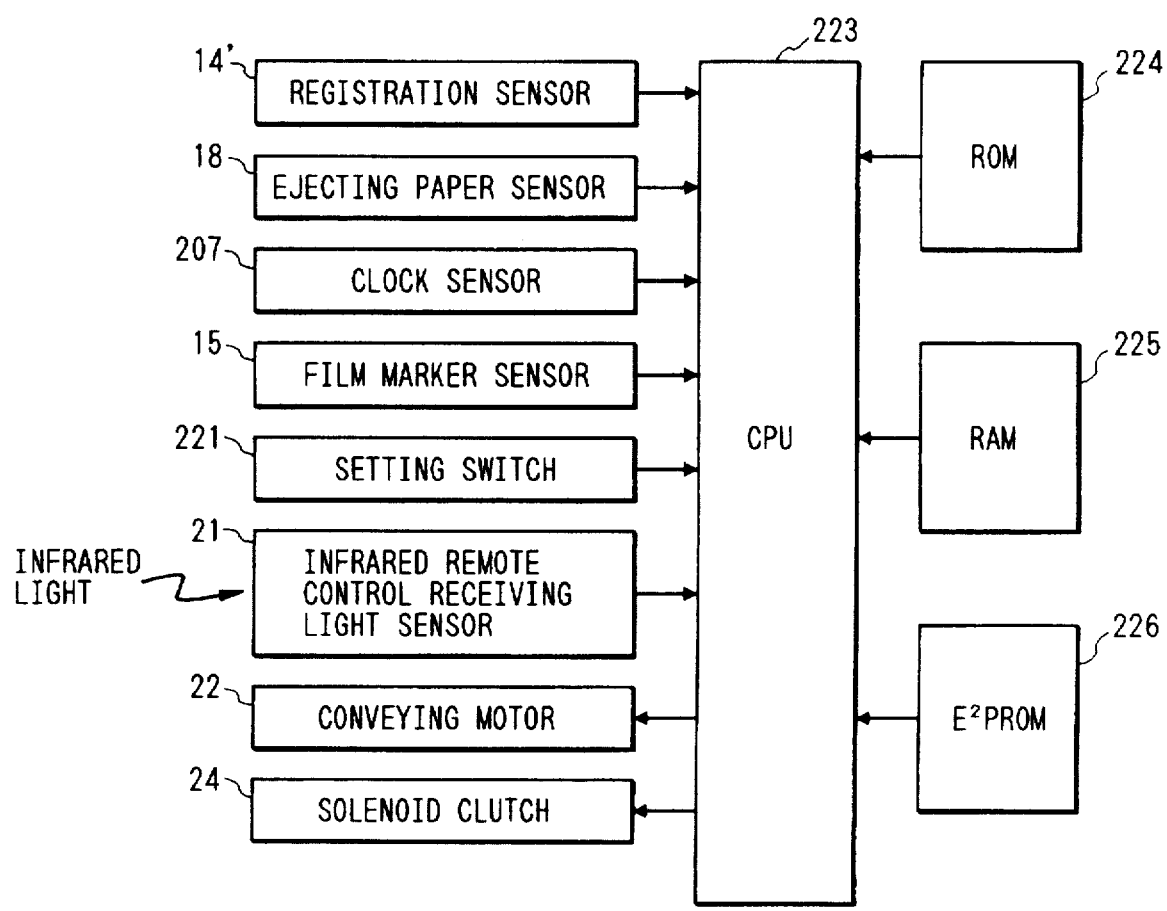
FIG. 6 is a block diagram of the OHP original feeder.

FIG. 6 is a circuit block diagram of the OHP feeder. In this embodiment, the OHP feeder employs a one-chip microcomputer 223 for the control.

The microcomputer 223 is connected to a ROM 224 storing a control program, a RAM 225 serving as a work area, a nonvolatile memory $E^2PROM$ 226, etc. Input ports of the microcomputer 223 are connected to the registration sensor 14 provided on the transport path 217, the discharge sensor 18 provided on the discharge path 218, the film marker sensor 15 for detecting the reference position of the lower transporting film, and various setting switches 221.

Also, an interruption port of the microcomputer 223 is connected to the clock sensor 207 for obtaining reference clock signals, indicating the amount of movement of the original, from the rotation of a clock disk 206 directly linked with the shaft of the transporting motor 22, an infrared remote control sensor 21 for receiving the key information from an infrared remote control unit, etc.

Also, output ports of the microcomputer 223 are connected to the transporting motor 22 and the solenoid clutch 24.

Figure 7:
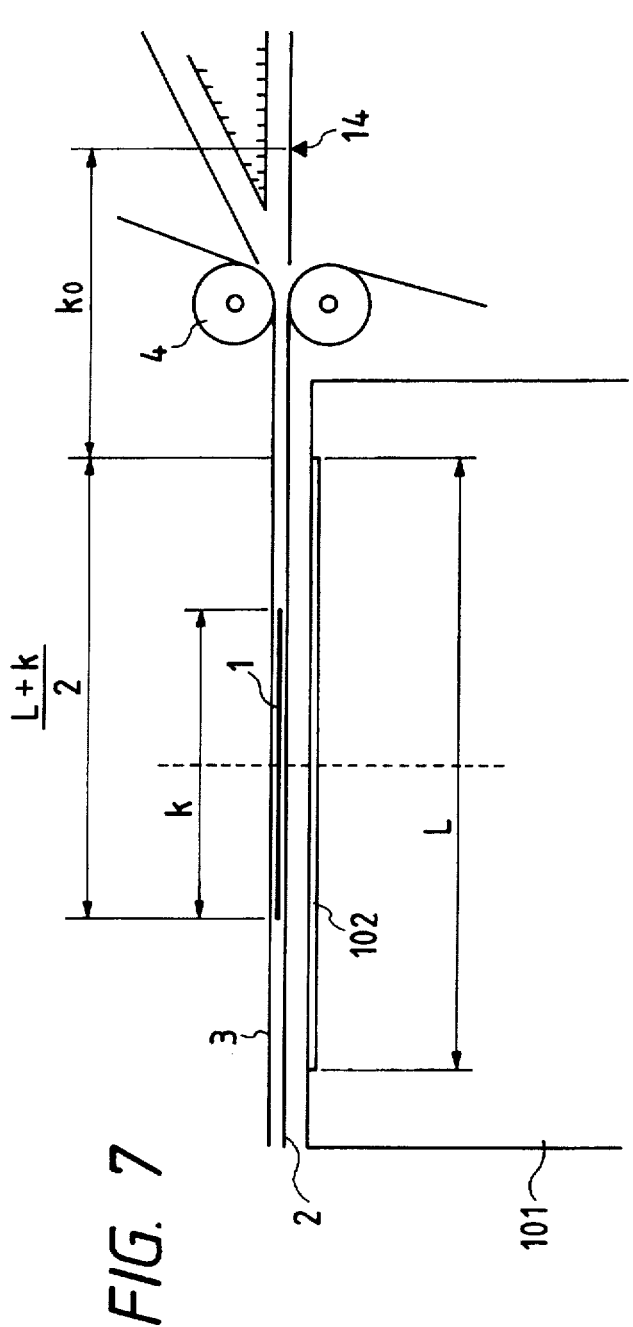
FIG. 7 is a view showing the principle of original stopping control.

FIG. 7 shows the principle of control of the original stopping position in the OHP feeder.

The displayed original is usually stopped in such a manner that the center of the original coincides with the center of the display stage 102. Therefore, the amount of transportation of the original, from the position of the registration sensor 14 to the above-mentioned stopping position where the center of the original 1 coincides with the center of the display stage 102, is represented by:

$$k_0+(L+k)/2$$

wherein:

L: length of the display stage;

k: length of the original in the transporting direction; and $k_0$: distance from the registration sensor to the end of the display stage.

L and $k_0$ are given by the configuration of the feeder, but k is variable according to the size of the original and according to whether the original is positioned vertically or laterally oblong. For this reason, k has to be measured in the course of transportation of the original.

Figure 8:
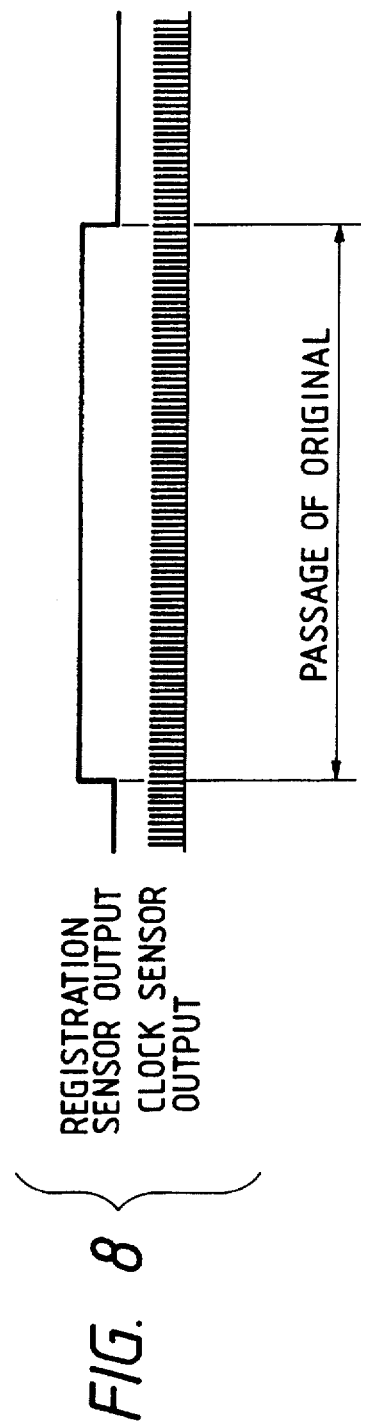
FIG. 8 is a view showing the principle of measurement of original length.

FIG. 8 shows the state of the outputs of the registration sensor 14 and the clock sensor 207, in the course of transportation of the original. By counting the number of clock pulses generated during the passing of the original 1 through the registration sensor 14, the original length (k) can be determined by:

original length (k)=number of clock pulses× amount of original advancement per pulse.

The transporting operation can, therefore, be controlled by determining an appropriate amount of transportation of the original from the measured length of the original.

Figure 9:
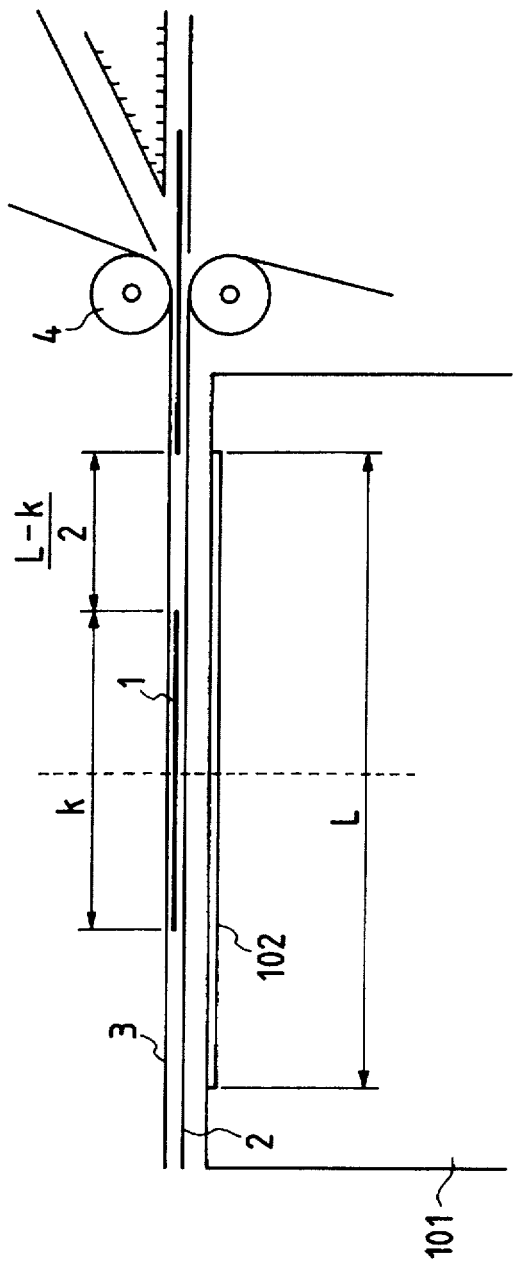
FIGS. 9 and 10 are views showing the principle of original gap control.
Figure 10:
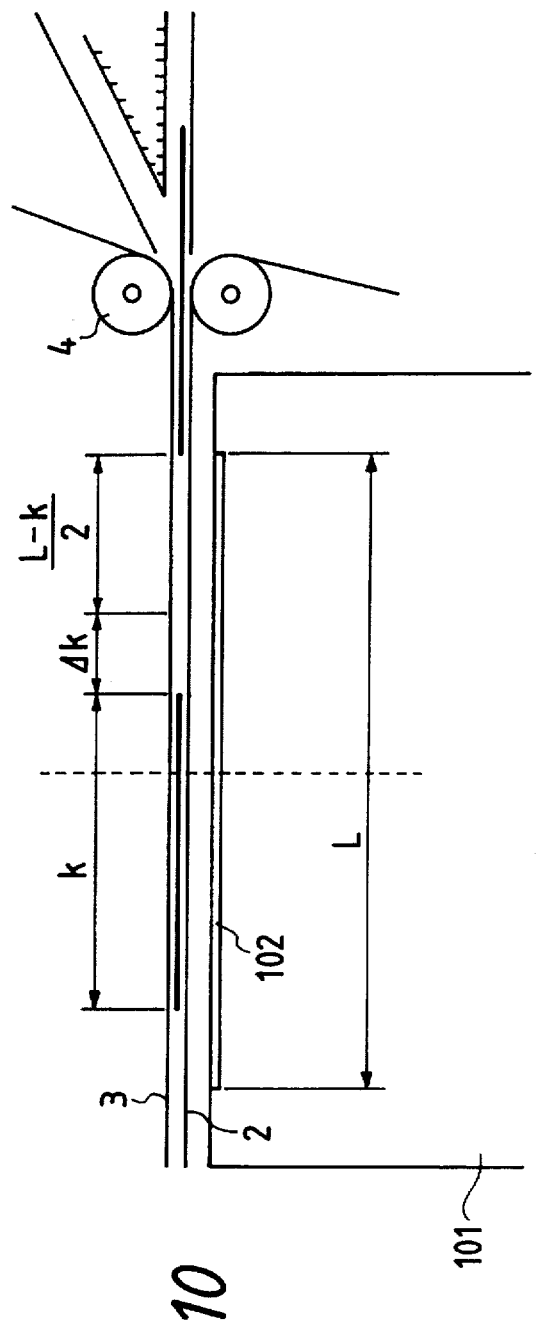

FIGS. 9 and 10 show the principle of control on the gap between the originals. When an original 1 is stopped at the center of the display stage 102, in order that a next original is not within the area of the display stage 102, there is required the following gap between the originals:

$$(L-k)/2$$

wherein

L: length of the display stage; and k: length of the original in the transporting direction.

Also, in case the original 1 placed on the display stage 102 is slightly moved for fine adjustment, and in order that a next original is not within the area of the display stage 102 even with the maximum amount of such fine adjustment, there is required the following gap between the originals:

$$\Delta k+(L-k)/2$$

wherein

L: length of the display stage;

k: length of the original in the transporting direction; and $\Delta k$: maximum amount of fine adjustment of the original.

The start of the transporting operation for the next original can be controlled with a timing corresponding to the determined gap.

Figure 11:
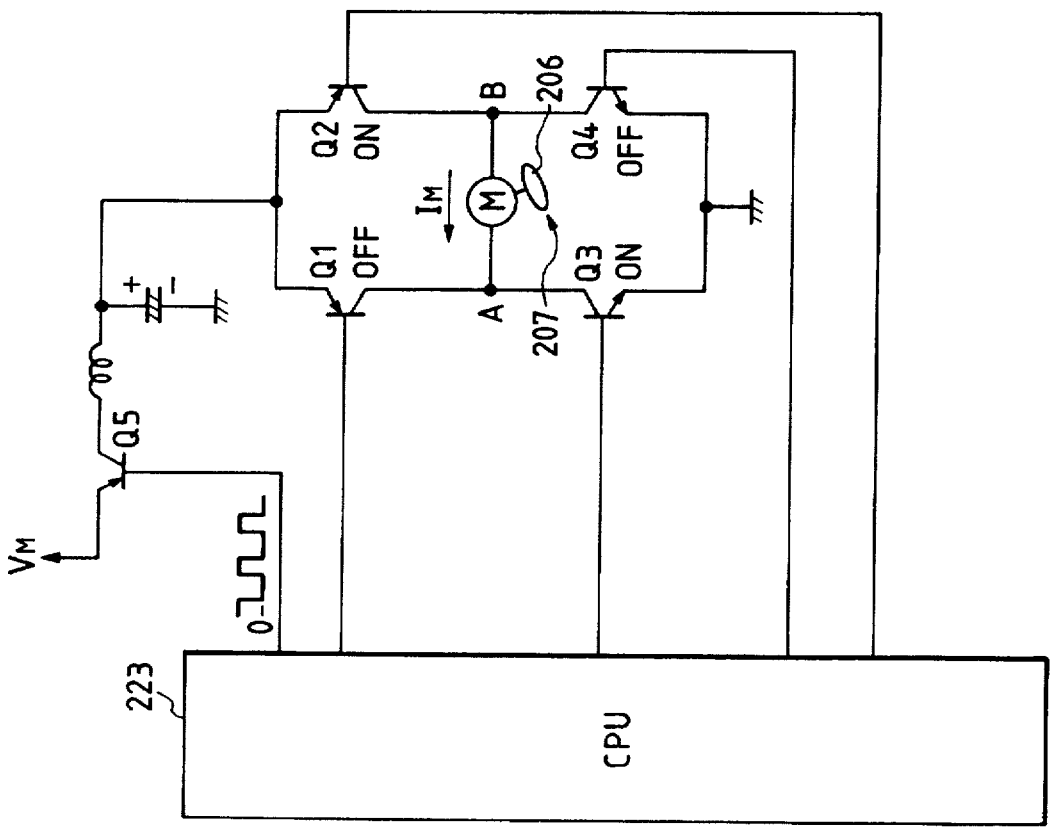

FIG. 11 shows a driving circuit for the transporting motor. The driving circuit is composed of a transistor bridge circuit for rotating the transporting motor in the forward and reverse directions.

For example, if the motor is rotated in a direction to transport the original in the forward direction by a motor current $I_M$ of a direction from B to A, such original transportation in the forward direction can be achieved by turning on transistors Q2, Q3, Q5 from the CPU. Also, the voltage supplied to the transporting motor can be arbitrarily controlled by PWM control of the ON signal for the switching transistor Q5. Consequently, the revolution of the transporting motor can be arbitrarily controlled.

Thus, the transporting speed of the original can be regulated by suitably varying the pulse width of the ON signal for the switching transistor Q5.

Also, the fine adjustment of the position of the original in the forward direction can be achieved by activating the transporting motor for a short period with a low transporting speed, and monitoring the number of the clock pulses. Also, the original transporting operation in the reverse direction can be achieved in a similar manner as explained above, with a motor current $I_M$ in a direction from A to B.

Figure 13:
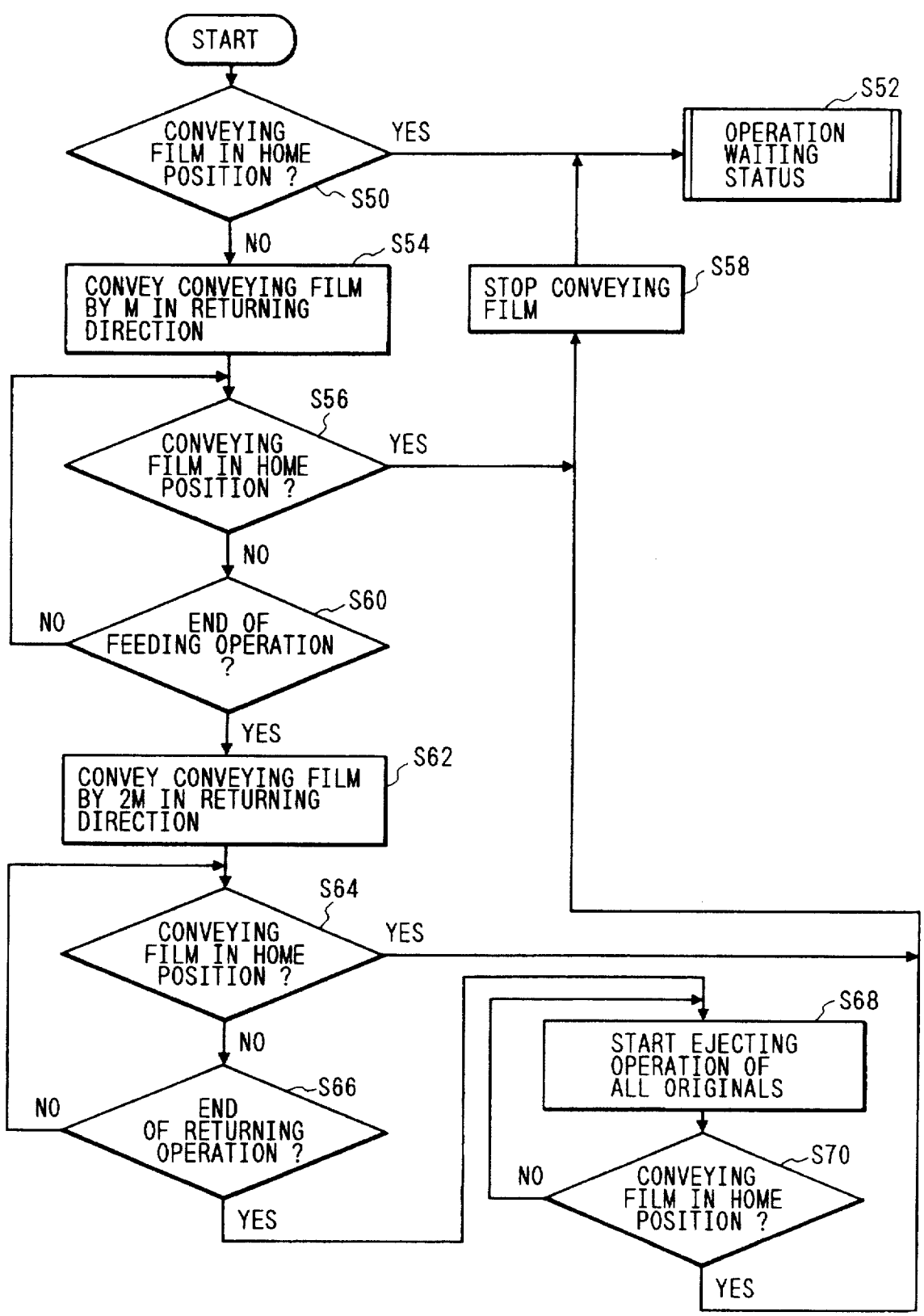
FIGS. 13 to 16 are flow charts showing the control sequences.

FIG. 13 shows a flow chart for checking the remaining original at the start of power supply. When the power supply is turned on, there is discriminated whether the conveying film 2 is in the home position (step S50) and, if so, there is entered a stand-by state for the operation signals from the infrared remote control unit (S52).

On the other hand, if the conveying film 2 is not in the home position, there is initiated a searching operation for the home position marker of the transporting film. At first, the conveying film is advanced in the forward direction by an amount M (S54). If the home position marker can be detected during said advancement (S56), the conveying films 3, 2 are stopped at the timing of said detection (S58), and there is entered the stand-by state for the operation signals from the infrared remote control unit (S52).

On the other hand, if the home position marker cannot be detected during the advancement, the conveying films 3, 2 are stopped and the forward transporting operation is terminated (S60). Then, the conveying films 3, 2 are moved in the reverse direction by an amount 2M (S62). If the home position marker can be detected during the movement (S64), the conveying films 3, 2 are stopped at the timing of the detection, and there is entered the stand-by state for the operation signals from the infrared remote control unit (S52).

On the other hand, if the home position marker cannot be detected during the movement, the conveying films 3, 2 are stopped and the reversing operation is terminated (S66).

At this point, it is identified that the originals of the preceding user are still retained in the OHP feeder, and there is initiated an operation of discharging all the originals (S68). This operation is continued until the home position marker of the conveying film is detected, and, upon detection (S70), the transporting films are stopped and there is entered the stand-by state for the operation signals from the infrared remote control unit.

Figure 12:
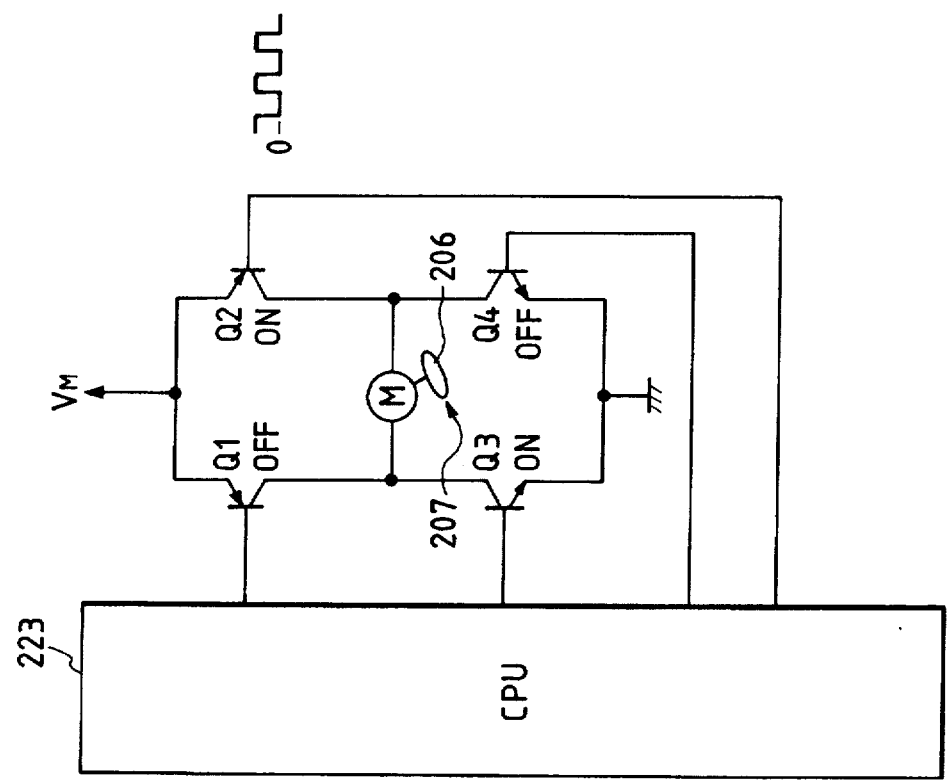
FIGS. 11 and 12 are circuit diagrams of a transport motor driving circuit.

FIG. 12 shows another embodiment of the driving circuit for the transporting motor. The driving circuit is composed of a transistor bridge circuit for rotating the transporting motor in the forward and reverse directions.

For example, if the motor is rotated in a direction to transport the original in the forward direction by a motor current $I_M$ of a direction from B to A, such original transportation in the forward direction can be achieved by turning on the transistors Q2 and Q3 from the CPU.

The voltage supplied to the transporting motor can be lowered in effective value, by PWM control of the ON signal for the transistor Q2. In this manner, the revolution of the transporting motor can be arbitrarily controlled.

Thus, the transporting speed of the original can be regulated by suitably varying the pulse width of the ON signal for the transistor Q2.

Also, the fine adjustment of the position of the original in the forward direction can be achieved by releasing the pulsed ON signal for the transistor Q2, for a short period. Also, the original transporting operation in the reverse direction can be achieved in a similar manner as explained above, with a motor current $I_M$ in a direction from A to B.

Figure 14:
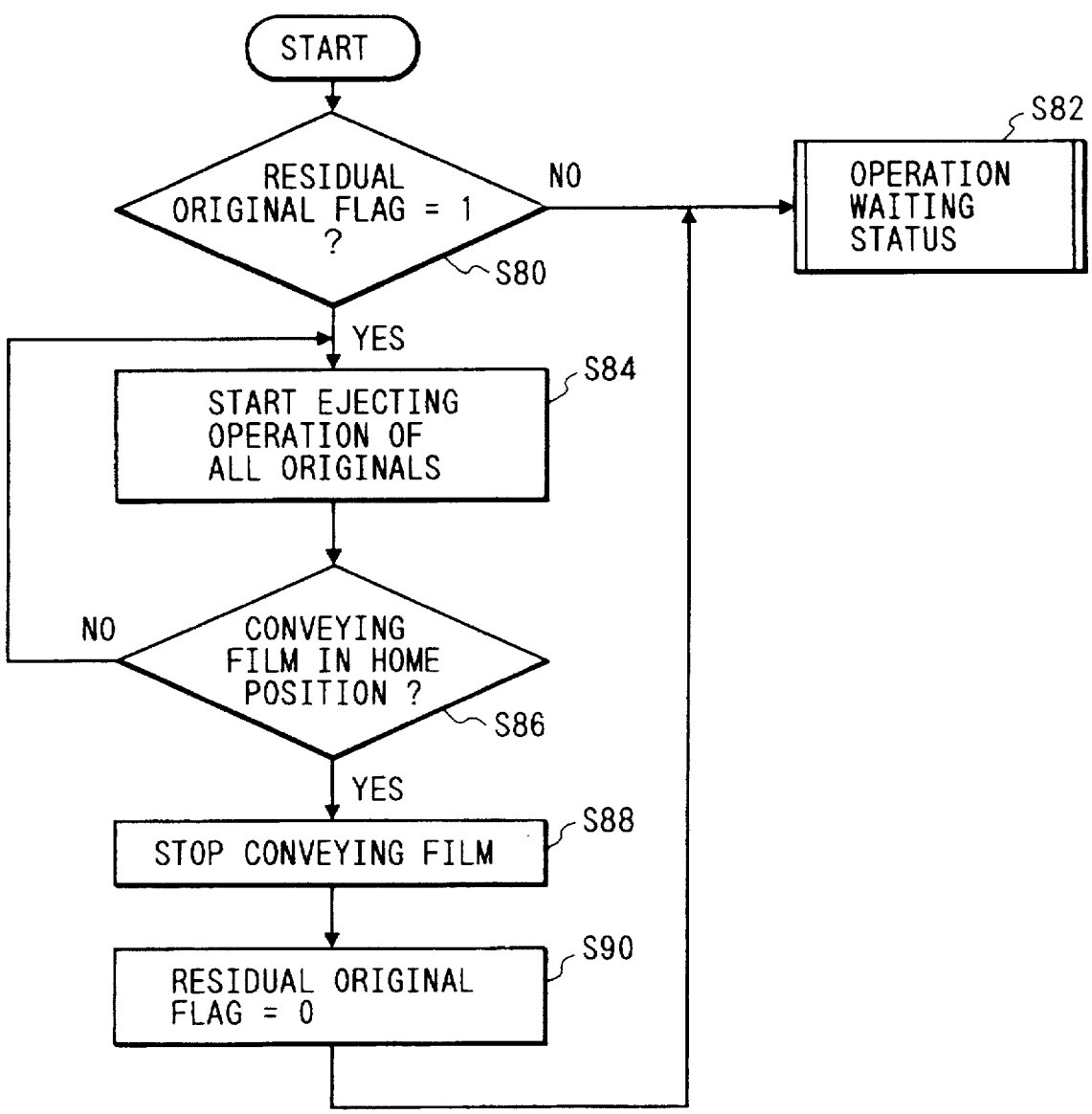

FIG. 14 is a flow chart showing another embodiment for checking the remaining original at the start of power supply. At the start of power supply, there is discriminated whether a remaining original flag "1" is set in the $E^2$PROM 26 (step S80). The flag is set as "1" when an original is transported and wound, and is reset to "0" when all the originals are discharged (S90).

If the remaining original flag is "0", there is entered the stand-by state for the operation signals from the infrared remote control unit (S82).

On the other hand, if the remaining original flag is "1", it is identified that the originals of the preceding user are still retained in the OHP feeder, and there is initiated the operation for discharging all the originals (S84). This operation is continued until the home position marker of the conveying film is detected and, upon detection, the conveying films are stopped and there is entered the stand-by state for the operation signals from the infrared remote control unit.

Figure 15:
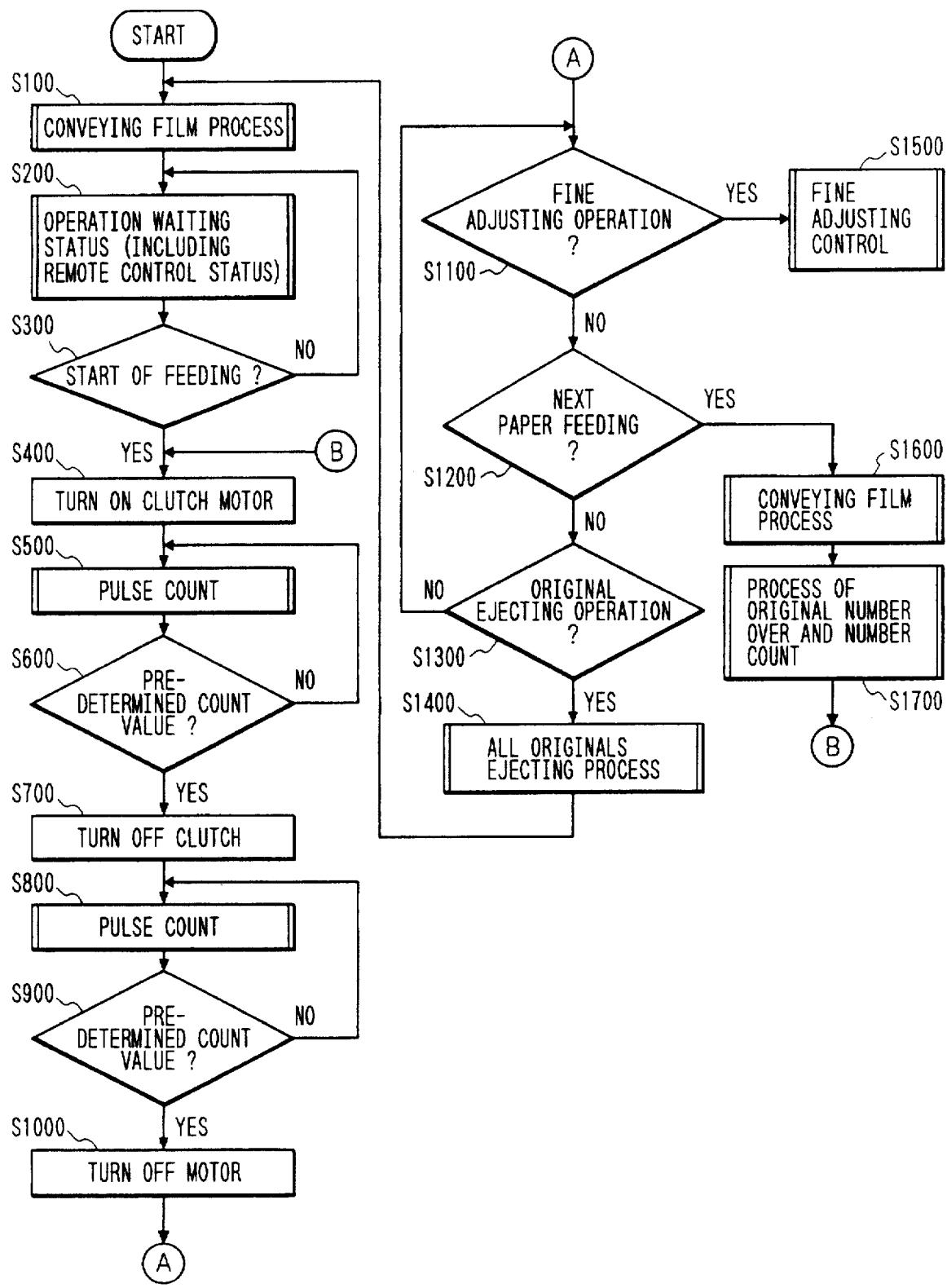

In the following there will be explained the control sequence for the entire OHP feeder, with reference to FIG. 15. The initializing operation is completed when the above-mentioned flag is set at "0" at the discharge of all the originals (S100). Then, there is entered a stand-by state for the operation (S200). When an operation signal is detected by the infrared remote control receiving unit in this state, the CPU analyzes the operation signal to identify a single feed mode, a fine adjustment mode or an all original discharging mode, whereupon a corresponding command is released to execute a corresponding sequence.

In the following there will be explained the operations of the single feed mode, according to the flow chart shown in FIG. 15. At first there is discriminated, in the stand-by state, whether a command for the single feed mode has been received (S300) and, if received, the transporting motor 22 and the solenoid clutch 24 are activated (S400) to separate and feed an original from the top side. When the front end of thus separated and fed original 1 passes the registration sensor 13, there is initiated a counting operation for the pulses (S500), in order to measure the moving amount and length of the original and, when the front end of the original becomes supported between the pinch rollers, the solenoid clutch 24 is turned off, depending on the pulse count, to terminate the original feeding operation (S700).

The original 1 continues transportation as it is supported between the upper and lower conveying films 3, 2. When the rear end of the original is detected by the registration sensor, there is determined the length of the originals and, upon counting a pulse number required for placing the original at the center of the display stage (S800), the transporting motor is turned off (S1000).

The transporting speed for such single feeding operation can be selected from plural speeds selected in advance.

After the transporting motor is turned off in the step S1000, a step S1100 discriminates whether the fine adjustment mode has been selected and, if selected, the sequence proceeds to a step S1500 for effecting the fine adjusting operation. If the fine adjustment mode has not been selected, the sequence proceeds to a step S1200 for discriminating whether a next original is to be fed. If not, the sequence further proceeds to a step S1300 for discriminating if the original discharge mode has been selected and, if the original discharge mode has been selected, the sequence proceeds to a step S1400 for effecting the discharge of the originals, and then the sequence returns to the step S100.

On the other hand, if the original discharge mode has not been selected in the step S1300, the sequence returns to the step S1100. Also, if the next original feeding operation is selected in the step S1200, the sequence proceeds to a step S1600 for processing the conveying films, and a step S1700 for counting the originals and discriminating whether all the originals have been processed, and then the sequence returns to the step S400. The entire OHP feeder is controlled in the above-explained manner.

Figure 16:
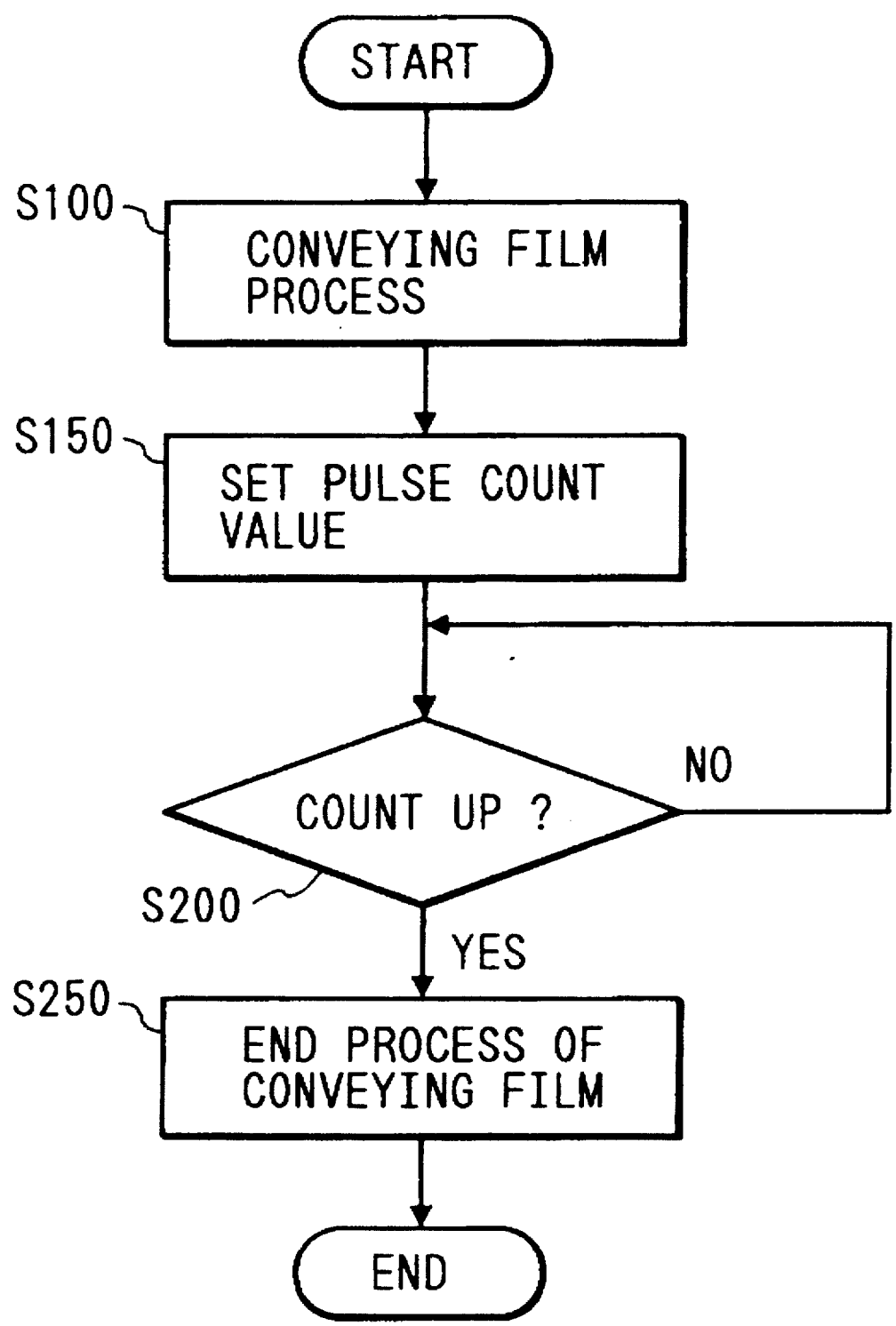

In the following there will be explained the fine adjustment mode, with reference to a flow chart shown in FIG. 16. In this mode, a step S100 effects the process for the conveying film, and a step S150 sets a number for the clock pulses required for the fine adjustment. The pulse number in this step can be arbitrarily selected. Then, a step S200 discriminates whether the counting operation of the clock pulses has been completed and, if not, the completion of the counting operation is awaited. Upon completion of the counting operation in the step S200, the sequence proceeds to a step S250 for the end process of the transporting film. The fine adjustment mode is conducted in this manner.

As explained in the foregoing, it is rendered possible to precisely position the original at the center of the display stage, even when the originals are variable in size or when vertically and laterally oblong originals are mixed.

It is also possible to reduce the amount of consumption of the conveying film, by maintaining a proper gap between the originals.

Also, even if the former user leaves the originals in the OHP feeder, it is rendered possible to properly discharge such originals from the OHP feeder prior to the use by the next user.

Furthermore, the display position of the original can be finely adjusted according to the requirement of the user.

Furthermore, as the original transporting speed can be set in plural levels, it is rendered possible to select an appropriate transporting speed, in consideration of the comfort of the observers or of the time available for presentation.

Furthermore, the presentation can be achieved without misunderstanding of the user, as the system can be controlled without complexity in the key configuration of a remote transmitting unit.

What is claimed is:

1. An original feeding device for consecutively feeding a plurality of originals to a display stage of a projecting apparatus for projecting the image of the original placed on the display stage, comprising:

original length detecting means for detecting length of the original;

transport means for consecutively transporting the plurality of originals one by one onto said display stage; and control means for activating said transport means, after a front end of the original transported by said transport means passes an end portion of said display stage, by an amount corresponding to the sum of one half of the length of said display stage and one half of the length of the original detected by said original length detecting means, wherein said control means is adapted to control the transportation of the originals in such a manner that the distance from a rear end of an original to a front end of a next original becomes at least equal to a distance, obtained by subtracting one half of the length of the original detected by said original length detecting means from one half of the length of the display stage.

2. An original feeding device according to claim 1, further comprising adjusting means for finely adjusting a stop position of the original on the display stage.

3. An original feeding device according to claim 1, further comprising selecting means for selecting a transporting speed of said transporting means from a plurality of speeds, wherein said transporting means transports the originals at the speed selected by said selecting means.

4. An original feeding device according to claim 1, wherein the originals are transparent sheets.

5. An original feeding device according to claim 1, wherein the projecting apparatus is an overhead projector.

6. An original feeding device for feeding originals to a display stage of a projecting apparatus for projecting the image of the original placed on the display stage, comprising:

a first transparent belt wound on a first roller;

a second transparent belt wound on a second roller, said second transparent belt being overlapped with said first transparent belt on the display stage;

stacking means for stacking the originals;

feeding means for feeding the originals on said stacking means one by one to be sandwiched between said first transparent belt and said second transparent belt;

a third roller for winding up said first and second transparent belts as said first transparent belt and said second transparent belt sandwich the originals;

detecting means for detecting a mark provided on one of said first or second transparent belts to indicate a home position of said first and second transparent belts; and control means for controlling winding by said first and second rollers or winding by said third roller in accordance with a detection result of said detecting means.

7. An original feeding device according to claim 6, further comprising ejecting means for ejecting the originals from between said first and second transparent belts, upon winding by said first and second rollers, to said stacking means.

8. An original feeding device according to claim 6, wherein said control means controls said third roller to wind a first predetermined amount and then controls said first and second rollers to wind a second predetermined amount.

9. An original feeding device according to claim 6, further comprising adjusting means for finely adjusting a stop position of the original on the display stage.

10. An original feeding device according to claim 6, further comprising selecting means for selecting a winding speed of said first and second rollers and said third roller.

11. An original feeding device according to claim 6, wherein the originals are transparent sheets.

12. An original feeding device according to claim 6, wherein the projecting apparatus is an overhead projector.

* * * * *

UNITED STATES PATENT AND TRADEMARK OFFICE
CERTIFICATE OF CORRECTION

PATENT NO. : 5,526,077
DATED : June 11, 1996
INVENTOR(S) : Sato et al.

It is certified that error appears in the above-indentified patent and that said Letters Patent is hereby corrected as shown below:

COLUMN 6:

Line 41, "cl" should be deleted.

Signed and Sealed this

Tenth Day of December, 1996

Attest:

Attesting Officer

BRUCE LEHMAN

Commissioner of Patents and Trademarks